Sept. 30, 1930.  R. E. ERVEN  1,777,078

CAM PLATE

Filed May 23, 1929

Inventor

R. E. ERVEN,

By Lister L. Sargent

Attorney

Patented Sept. 30, 1930

1,777,078

UNITED STATES PATENT OFFICE

ROSS E. ERVEN, OF COUNCIL BLUFFS, IOWA

CAM PLATE

Application filed May 23, 1929. Serial No. 365,401.

The object of my invention is to provide a novel and adjustable cam plate for use on lathes, boring machines and milling machines whereby an offset circular cut of the desired size may be made by the device; and to provide a mechanism of simple and comparatively inexpensive construction for accomplishing the desired object.

I attain these and other objects of my invention by the mechanism illustrated in the accompanying drawings, in which,—

Figure 3:
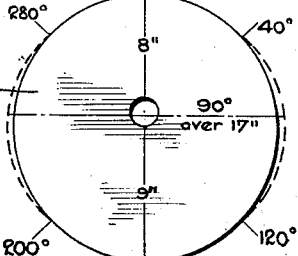

Fig. 3 is a front plan view, reduced size, the dotted lines indicating approximately the area of the cut which comes out on each side, the rest of the circle remaining the same, whereby an elliptical cut is made depending on the adjustment of plate 3 relative to disc 2, the amount of the cut varying with the degree of offset adjustment of the plate 3 relative to the disc 2.

Like numerals designate like parts in each of the views.

Referring to the accompanying drawings, 1 designates the face plate of the lathe, boring machine or milling machine to either of which my invention may be applied.

Figure 1:
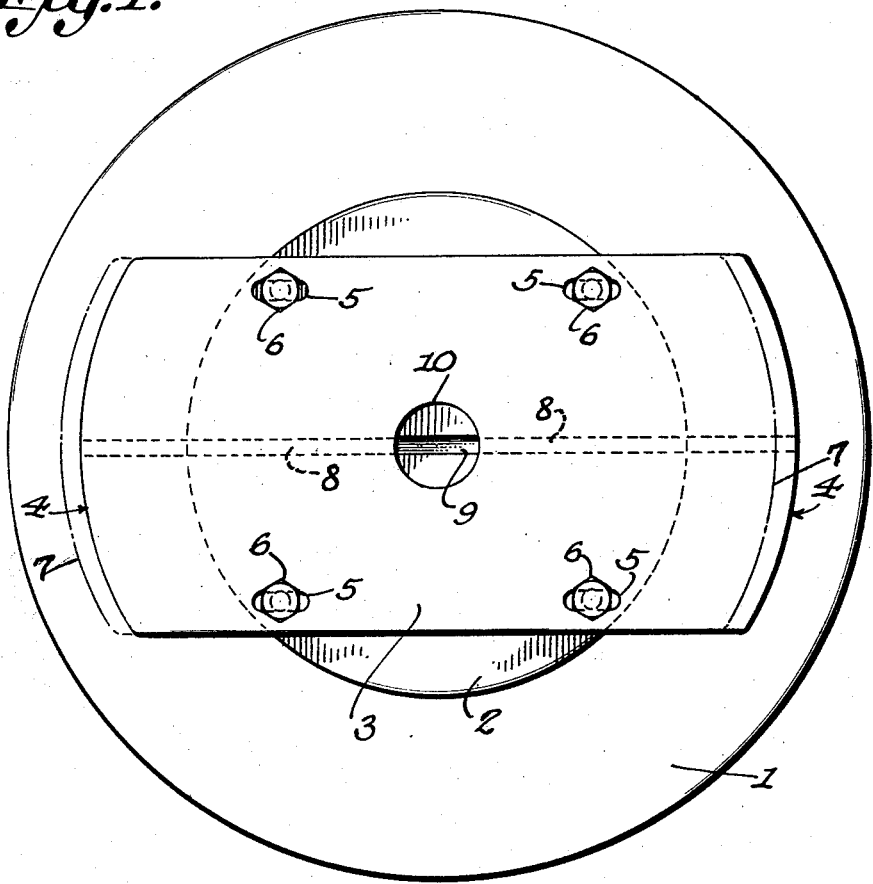
Figure 1 is a front elevation of the invention.
Figure 2:
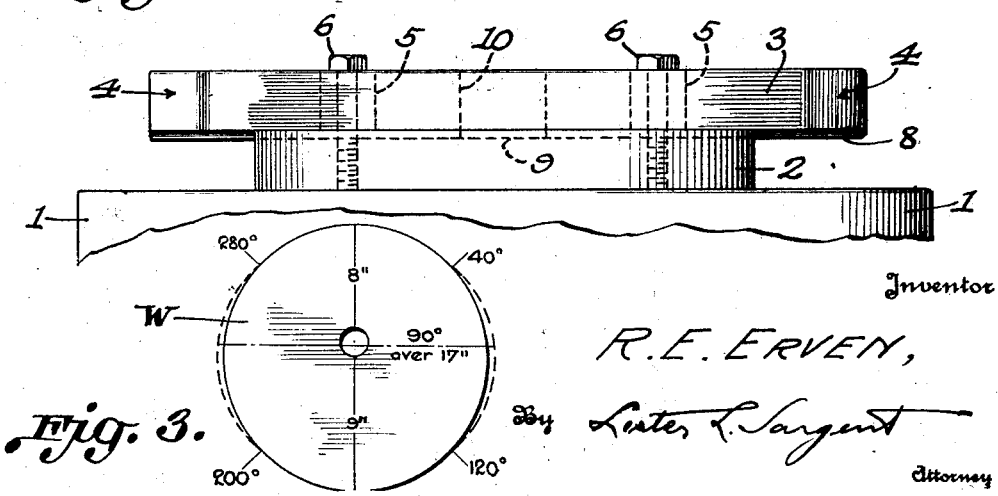
Fig. 2 is a side elevation of the invention.

I provide a metal disc 2 affixed to the face plate 1 and I also provide an elongated plate 3 of approximately elliptical shape and having its ends 4 extending substantially beyond the disc 2. The plate 3 is provided with a plurality of alined parallel slots 5 to receive cap screws 6, the threaded ends of which engage the metal disc 2, and a key 8 on its under side, as shown in Fig. 2, whereby to permit of adjusting the elongated plate 3 as indicated by the dotted lines 7, as shown in Fig. 1, to permit of regulating the size and shape of the cut. I provide a keyway 9 on disc 2 to slidably engage the longitudinal keyway groove 9 in the plate 3 as indicated in Fig. 1.

In operation the plate 3 is longitudinally adjustable relative to the disc 2 to permit of making the desired off center cut on the material, the slots 5 in plate 3 permitting of a longitudinal adjustment of that member, as indicated by the dotted lines 7 in Fig. 1 to permit of a cam like action in operation as indicated by the dash and dot lines in Fig. 3. Disc 2 is bolted or screwed on the lathe, boring machine as milling machine. Then plate 3 is adjustably bolted in place as shown in Fig. 1 of the drawings in an off center position relative to disc 2. To make the desired elliptical or off center circular cut preferably to substantially .045 on opposite sides and the rest of the circle remaining the same or the cut may be started at any degree and stopped at any degree. The position of plate 3 off center governs the cut of the tool.

What I claim is:—

1. An attachment for use on lathes, boring machines and milling machines, comprising a circular disc adapted to be affixed to the face plate of the machine, an approximately elliptical plate having its ends projecting beyond the disc, said plate having a longitudinal key on its under side, the disc having a keyway groove for the aforesaid key, the said plate having elongated slots, cap screws extending through the slots and screwed to the disc, the cam plate being longitudinally adjustable relative to the circular disc and to the face of the machine to which the plate is applied, whereby the device may be used for cutting an off center circular cut on the desired material.

2. An attachment for use on lathes, boring machines and milling machines, comprising a circular disc adapted to be affixed to the face plate of the machine, an approximately elliptical plate having its ends projecting beyond the disc, and on which the elliptical plate is longitudinally slidable, said plate and disc having means for preventing other than a longitudinal movement of the plate relative to the disc, the said plate having elongated slots, means engaging in the slots for adjustably fastening the plate to the disc whereby the plate may be moved to a position to make an offset cut on the desired material relative to the disc and the face of the machine to which the disc and plate are applied.

ROSS E. ERVEN.